United States Patent
Aguirre et al.

(10) Patent No.: US 10,098,100 B2
(45) Date of Patent: Oct. 9, 2018

(54) PROVIDING LTE NETWORK DEVICES WITH DOWNLINK CHANNELS IN AN UNLICENSED SPECTRUM

(71) Applicant: Verizon Patent and Licensing Inc., Arlington, VA (US)

(72) Inventors: Sergio Aguirre, Southlake, TX (US); Rakesh Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 296 days.

(21) Appl. No.: 15/059,115

(22) Filed: Mar. 2, 2016

(65) Prior Publication Data

US 2017/0257847 A1 Sep. 7, 2017

(51) Int. Cl.
*H04W 72/04* (2009.01)
*H04W 72/08* (2009.01)
*H04W 88/04* (2009.01)
*H04W 16/14* (2009.01)

(52) U.S. Cl.
CPC ....... *H04W 72/042* (2013.01); *H04W 72/082* (2013.01); *H04W 72/085* (2013.01); *H04W 16/14* (2013.01); *H04W 88/04* (2013.01)

(58) Field of Classification Search
CPC . H04W 72/042; H04W 72/082; H04W 88/04; H04W 16/14; H04W 72/085
See application file for complete search history.

(56) References Cited

U.S. PATENT DOCUMENTS

| 9,615,382 | B2 * | 4/2017 | Ljung | H04W 74/004 |
| 2013/0343261 | A1 * | 12/2013 | Gonsa | H04B 7/2606 |
| | | | | 370/315 |
| 2017/0094675 | A1 * | 3/2017 | Salem | H04W 16/14 |
| 2017/0273101 | A1 * | 9/2017 | Cimpu | H04W 74/0808 |
| 2017/0318565 | A1 * | 11/2017 | Golitschek Edler von Elbwart | H04W 72/042 |

* cited by examiner

*Primary Examiner* — Oussama Roudani

(57) ABSTRACT

A small cell device may communicate with a user device (e.g., a smartphone, a tablet computer, etc.) via a range extender device that extends the effective range of the small cell device to the user device. The small cell device, the range extender device, and the user device may communicate with one another using channels of a licensed spectrum (e.g., traditional LTE channels). The range extender device may determine channel conditions corresponding to an unlicensed spectrum (e.g., 5 Gigahertz (GHz) Spectrum) and communicate the channel conditions to the small cell device. Based on the channel conditions, the small cell device and the range extender device may select downlink-only channels of the unlicensed spectrum and cause the downlink capabilities of the channels of the unlicensed spectrum to be augmented by the downlink capabilities of the downlink-only channels of the unlicensed spectrum.

20 Claims, 9 Drawing Sheets

Each band may have multiple 5Ghz channels

PROVIDING LTE NETWORK DEVICES WITH DOWNLINK CHANNELS IN AN UNLICENSED SPECTRUM

BACKGROUND

Long-Term Evolution (LTE) networks and devices typically communicate with one another using channels that correspond to a licensed spectrum of radio frequencies (also referred to herein as "LTE channels"). Recently, however, LTE in the Unlicensed Spectrum (LTE-U) and License Assisted Access (LAA) are being developed with the aim of apply LTE communication standards to other radio frequency spectrums. An example of such a spectrum includes the 5 Gigahertz (GHz) Unlicensed Spectrum for WiFi and Other Unlicensed Uses set forth by the Federal Communications Commission (FCC) of the United States of America.

LTE-U and LAA technologies may often be implemented using small cell devices that operate as enhanced node Bs (eNBs) but with much smaller coverage areas (often on the order of tens of meters in diameter). In some scenarios, a network device, such as a repeater device or an LTE Relay Node, may be used to extend the coverage area of a small cell device by a few meters. A repeater device may extend the coverage area of the small cell device by simply rebroadcasting the signal from the small cell device. An LTE Relay Node, on the other hand, may increase the coverage range of a small cell device to operate the small cell device in a more active and independent manner. For instance, an LTE Relay Node may receive, demodulate, and decode a signal from the small cell device, and then retransmit a new signal using the same band as the small cell device (for in-band communications) or in a separate band (for out-of-band communications).

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1A:
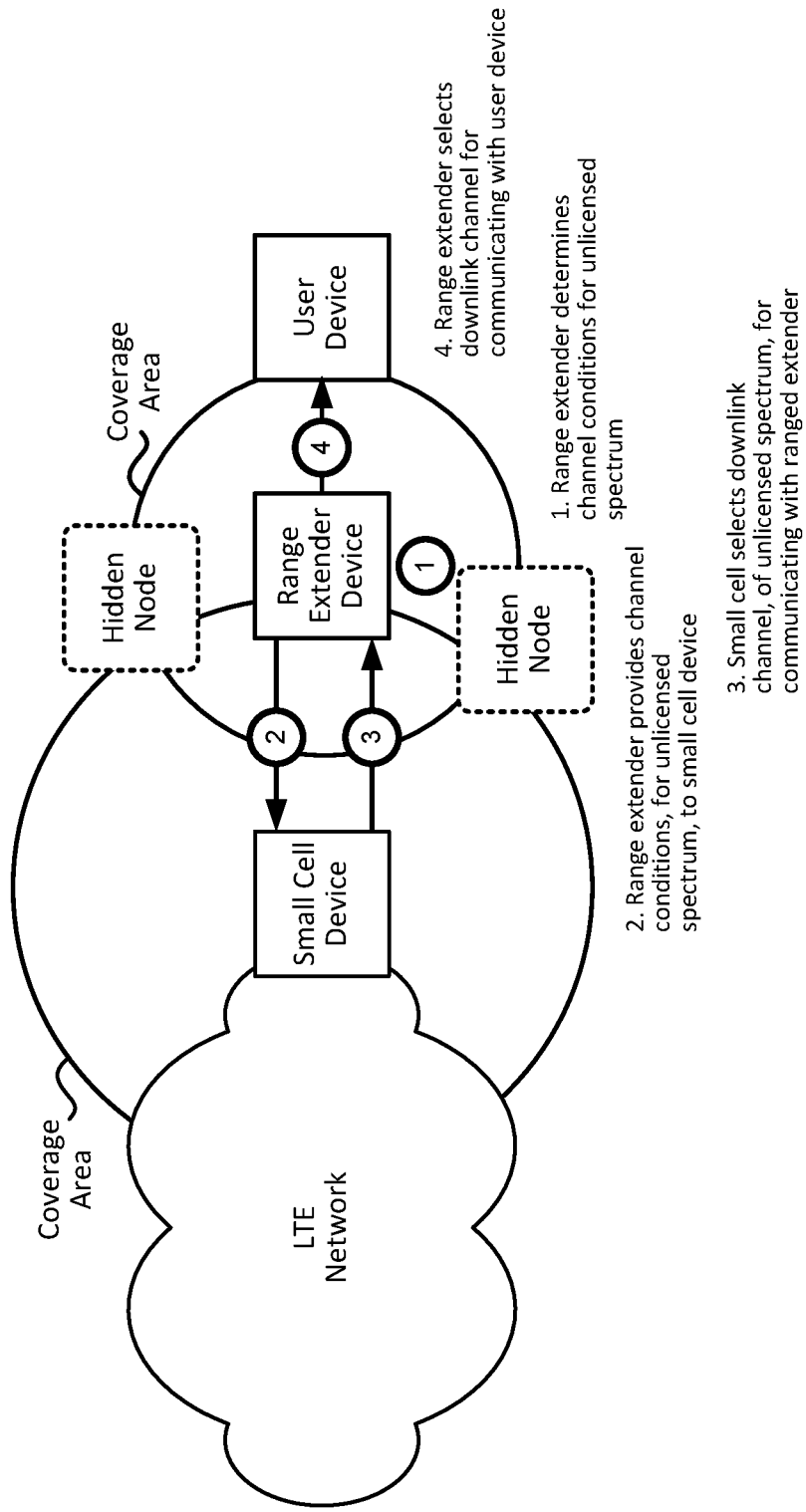
FIGS. 1A and 1B illustrate an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Current wireless telecommunications technologies include techniques for implementing a small cell device that operates as a base station, such as an enhanced Node B (eNB), but with a limited coverage area, such as a coverage area with a diameter on the order of tens of meters. Such technologies also include an ability to extend a coverage area of small cell devices by using a wireless repeater or another type of range extender device. The small cell device may communicate (via the range extender device) with user devices via channels that correspond to a spectrum of radio frequencies that have been licensed for wireless telecommunications (referred to herein as a "licensed spectrum channel").

In some instances, the small cell device and the range extender device may enhance the ability of the small cell device to communicate with the user device by augmenting the downlink capabilities of a licensed spectrum channel with the downlink capabilities of a channel from other radio frequencies. The channel of the other radio frequencies may include a channel that corresponds to an unlicensed spectrum (referred to herein as an "unlicensed spectrum channel"), such as the 5 Gigahertz (GHz) Unlicensed Spectrum for WiFi and Other Unlicensed Uses set forth by the Federal Communications Commission (FCC).

Additionally, the unlicensed spectrum channel may be a downlink-only channel (e.g., a communication channel that may only be used to communicate information in a downlink direction), from the small cell device to the range extender device and/or from the range extender device to the user device. Since the downlink-only channel may be used to augment the downlink capabilities of the licensed spectrum channel, the unlicensed spectrum channel may include a supplementary downlink (SDL) channel to the licensed spectrum channel.

However, in some implementations, currently available techniques for selecting unlicensed spectrum channels may be ineffective and unreliable. For example, the small cell device and/or the range extender device may not be capable of determining whether using an unlicensed spectrum channel will be effective since another small cell device (and/or another range extender device) in the area may already be using the unlicensed spectrum channel and/or creating enough interference within the unlicensed spectrum so as to render an available channel unreliable transmitting information to the user device. This may be further complicated by other devices in the vicinity, such as WiFi-enabled devices, that are also using the unlicensed spectrum for wireless communications.

Techniques described herein may be used to reliably select unlicensed spectrum channels for augmenting the downlink capabilities of licensed spectrum channels. For example, a small cell device may communicate with a user device (e.g., a smartphone, a tablet computer, etc.) via a range extender device that extends the effective range of the small cell device to the user device. The small cell device, the range extender device, and the user device may communicate with one another using a typical channel (e.g., an LTE channel) of a licensed spectrum.

In addition, the range extender device may determine channel conditions corresponding to an unlicensed spectrum and may communicate the channel conditions to the small cell device. In response, the small cell device may select an unlicensed spectrum channel based on the channel conditions from the range extender device. The unlicensed spectrum channel may be used, as a supplemental downlink (SDL) channel, in conjunctions with the licensed spectrum channel, to increase to overall downlink capabilities from the small cell device to the range extender device.

The range extender device may also select an unlicensed spectrum channel for communicating information, from the small cell device, to the user device. In some implementations, the range extender device may operate as a relatively passive relay device, such that the range extender device may automatically select the same unlicensed spectrum channel (for communicating with the user device) that was selected by the small cell device (for communicating with the range extender device). In other implementations, the range extender device may operate as a more independent or proactive device by, for example, analyzing the channel conditions of the unlicensed spectrum, identifying an appropriate unlicensed spectrum channel, and using the unlicensed spectrum channel to send information (from the small cell device) to the user device. As such, depending on the implementation, the range extender device may be relatively dependent or independent about which unlicensed spectrum channel is used by the range extender device to communicate information to the user device.

Figure 1B:
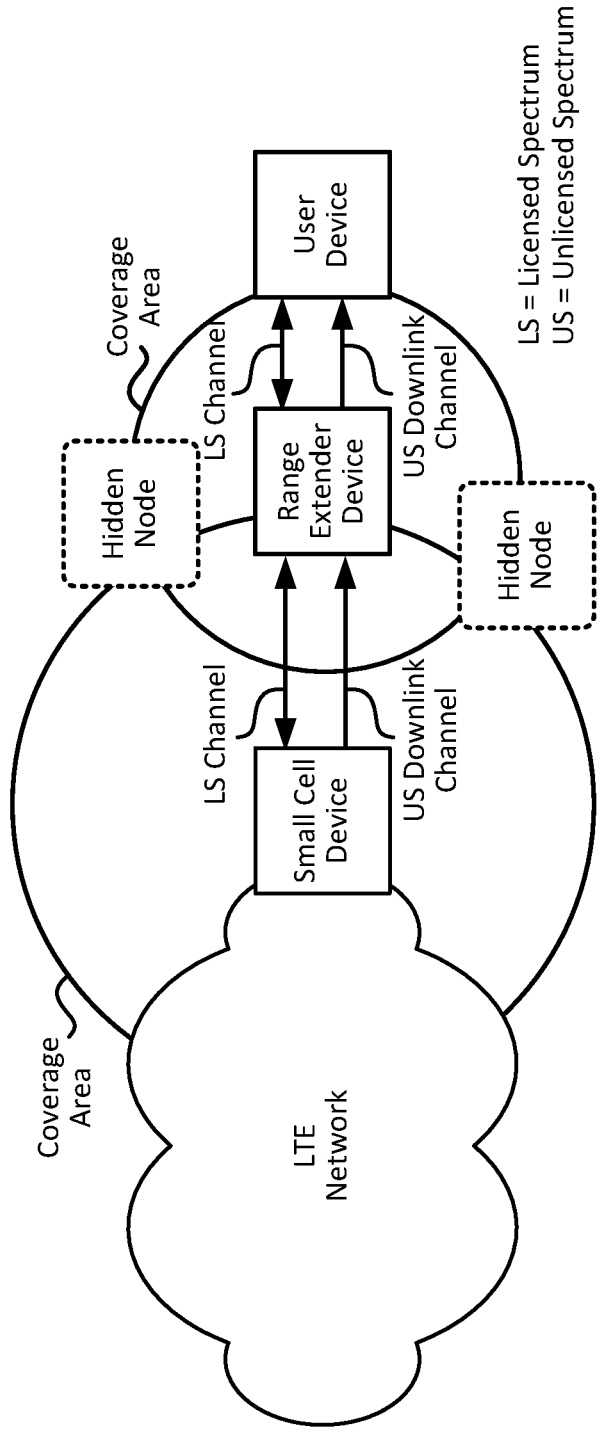

FIGS. 1A and 1B illustrate an example overview of an implementation described herein. Referring to FIG. 1, an LTE network may include a small cell device capable of operating as an eNB for user devices within a relatively small coverage area (e.g., a coverage area that may be measured in the tens of meters in diameter). As shown, a range extender device may be used to extend the effective coverage area of the small cell device so that a user device located outside of the actual coverage area of the small cell device may connect to the LTE network. The small cell device, the range extender device, and the user device may communicate with one another using traditional LTE channels (e.g., channels of a licensed spectrum of radio frequencies), which may include Personal Communications Service (PCS) and/or Advanced Wireless Services (AWS).

At some point, it may be beneficial to use one or more downlink channels, of an unlicensed spectrum (e.g., the 5 GHz Spectrum) to communicate information from the small cell device to the user device. The downlink channel may include a downlink-only channel or a supplemental downlink (SDL) for a traditional LTE channel. As such, the range extender device may analyze channel conditions regarding the unlicensed spectrum (at 1). For example, the range extender device may determine whether there are other LTE devices in the vicinity that are using one or more channels of the unlicensed spectrum and/or an amount of interference that appears to be affecting one or more of the channels of the unlicensed spectrum. In another example, the range extender device may also determine whether there are other types of devices (e.g., non-LTE devices) in the vicinity that are currently using the unlicensed spectrum. As shown in FIGS. 1A and 1B, such devices may be referred to herein as hidden nodes, and may include devices using the unlicensed 5 GHz Spectrum to communicate via WiFi or another of standard. In some implementations, the range extender device may also analyze how channel conditions (e.g., interference from other wireless devices) appear when the range extender uses different levels of power to communicate radio signals.

The range extender device may provide the channel conditions to the small cell device (at 2), which may enable the small cell device to select an appropriate downlink channel for communicating with the range extender device (at 3). In some implementations, the range extender device may select a downlink channel, for communicating information to the user device, based on the channel selected by the small cell device (at 4). Alternatively, the range extender device may determine that a different downlink channel is more appropriate for communicating information to the user device and may therefore select the different downlink channel.

Referring now to FIG. 1B, the downlink channels selected by the small cell device and the range extender device, from the unlicensed spectrum, may be used in combination with licensed spectrum channels (e.g., traditional LTE channels). As such, techniques described herein may enable a small cell device and/or a range extender device to analyze channel conditions within an unlicensed spectrum, determine, based on the channel conditions, the best downlink channels of the unlicensed spectrum, and use the downlink channels, in combination with channels of the licensed spectrum, to augment the overall downlink capabilities of an LTE network.

Figure 2:
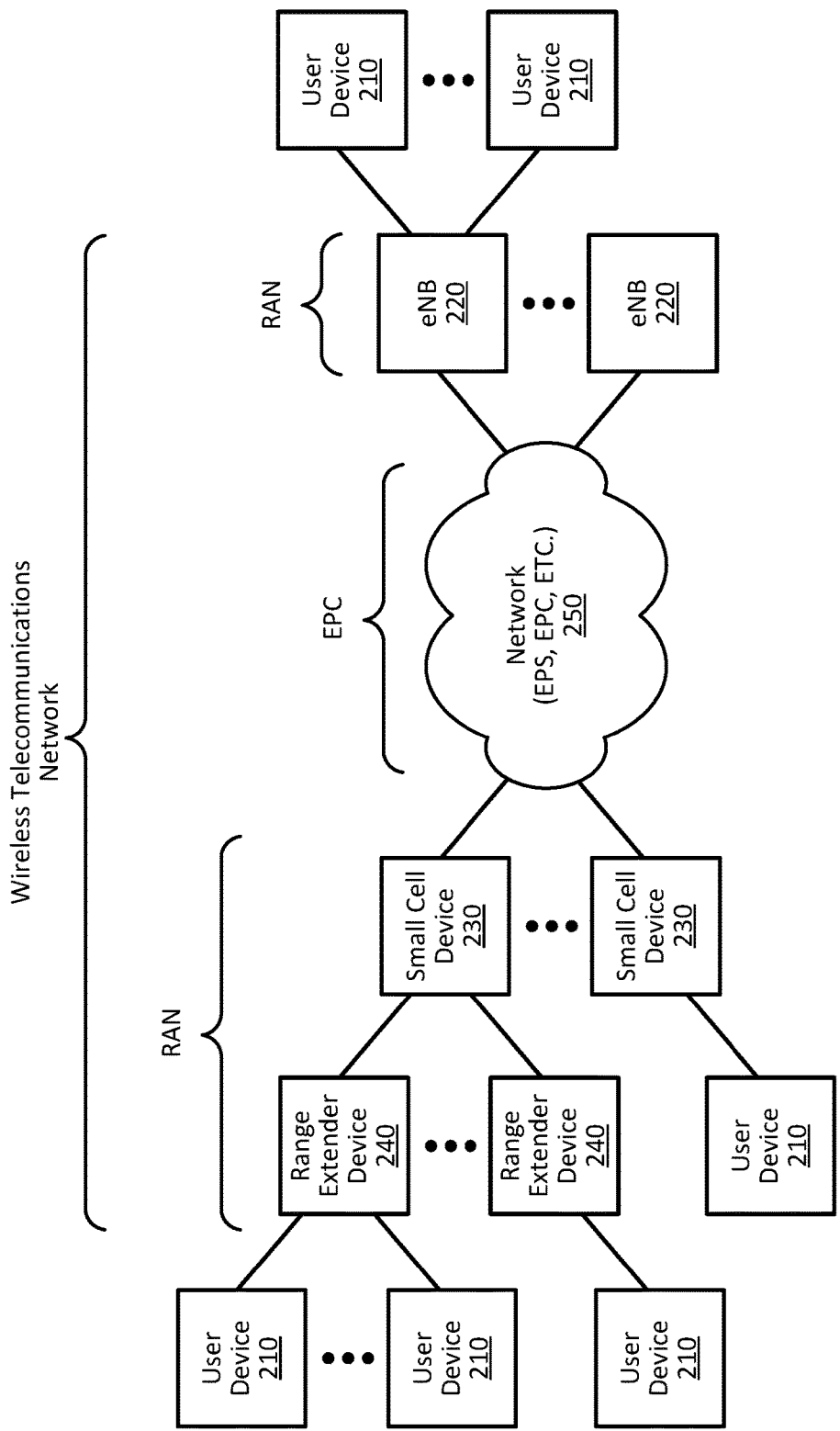
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, enhanced nodeBs (eNBs) 220, small cell devices 230, range extender devices 240, and network 250.

As shown, environment 200 may include an Evolved Packet System (EPS) that includes an LTE network and an evolved packet core (EPC) network that operate based on a 3rd Generation Partnership Project (3GPP) wireless communication standard. The LTE network may be, or may include, radio access networks (RANs) that include one or more base stations, some or all of which may take the form of eNBs 220, via which user devices 210 may communicate with the EPC network. The RANs may also, or alternatively, include one or more small cell devices 230 and/or range extenders, via which user devices 210 may communicate with the EPC network.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 250. User device 210 may also include a computing and communication device that may be worn by a user (also referred to as wearable devices) as a watch, a fitness band, a necklace, glasses, an eyeglass, a ring, a belt, a headset, or another type of wearable device.

eNB 220 may include one or more network devices that receives, processes, and/or transmits traffic destined for and/or received from user device 210 (e.g., via an air interface). eNB 220 may be connected to a network device, such as site router, that functions as an intermediary for information communicated between eNB 220 and the EPC.

Small cell device 230 may include a network device that operates in the same manner, or in a similar manner, as eNB 220, except that a coverage area for small cell device 230 may be much smaller than a coverage area of eNB 220. Small cell device 230 may include one or more network devices that receives, processes, and/or transmits traffic destined for and/or received from user device 210 (e.g., via an air interface). Small cell device 230 may also be connected to a network device, such as a site router, that functions as an intermediary for information communicated between eNB 220 and the EPC. In some implementations, small cell device 230 may be implemented by an eNB with a reduced coverage area.

Range extender device 240 may include a network device that may operate to extend the effective coverage area of small cell device 230. In some implementations, range extender device 240 may include a repeater device that may relay information from small cell device 230 to user device 210. In such implementations, range extender device 240 may use the same cell identifier (ID) as small cell device 230, and thus may appear (e.g., to user device 210) as the same device. In some implementations, range extender device 240 may include a more functionally complex and/or independent device, capable of receiving, demodulating, and decoding information from small cell device 230, in addition to retransmitting the information to user device 210 using a channel that may be the same as, or different than, the channel used by small cell device 210. In such implementations, range extender device 240 may have its own cell ID, have its own overhead messages, and appear as an independent cell from the perspective of user device 210.

In some implementations, range extender device 240 may be a small cell device used to extend the coverage area of small cell device 230. A benefit of such an implementation may include having more than one cell share a backhaul network of a wireless telecommunications network (e.g., where only one cell (e.g., small cell device 230) is actually connected to the backhaul network and the other (e.g., range extender device 230) is an independent eNB but does not require a dedicated backhaul), which may make deployment very easy.

In some implementations, range extender device 240 may monitor network conditions corresponding to an unlicensed spectrum and provide channel conditions information corresponding to an unlicensed spectrum. Examples of such information may include whether a particular channel is being used or is subject to enough signal interference so as to make the channel unreliable for communicating information within a local coverage area. Additional examples may include an indication of which channels are not being used and/or are not subject to a significant (or threshold) amount of signal interference.

Network 250 may include an EPC of a wireless telecommunications network. However, in some implementations, network 250 may include one or more additional, wired and/or wireless, networks. For example, network 250 may include a cellular network (e.g., a second generation (2G) network, a third generation (3G) network, a fourth generation (4G) network, a fifth generation (5G) network, global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
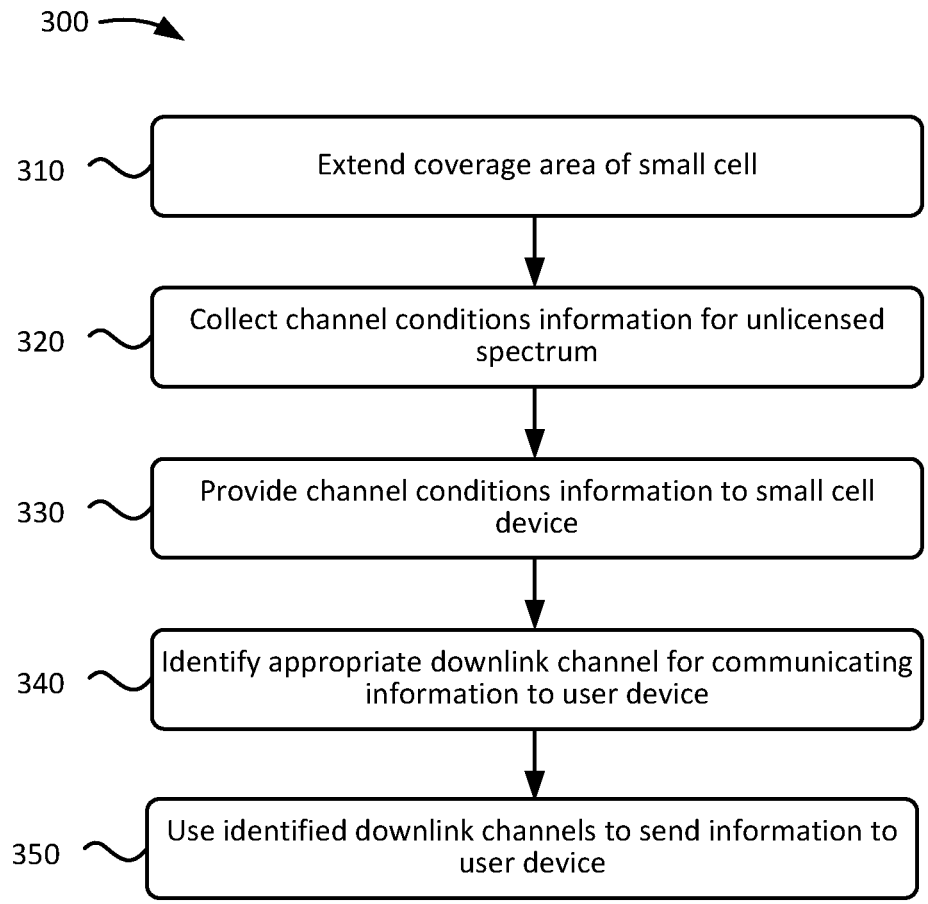
FIG. 3 is a flowchart of an example process for selecting a downlink channel, in unlicensed spectrum, for communicating information from a small cell device to user a device.

FIG. 3 is a flowchart diagram of an example process 300 for selecting a downlink channel, in an unlicensed spectrum, for communicating information from small cell device 230 to user device 210. Process 300 may be implemented by one or more of small cell device 230 and range extender device 240.

As shown, process 300 may include extending a coverage area of a small cell device 230 (block 310). For example, user device 210 may be located outside of the coverage area of small cell device 230, and therefore may not be capable of communicating directly with small cell device 230. However, user device 210 may be within a coverage area of range extender device 240, and range extender device 240 may be in communication with small cell device 230. As such, range extender device 240 may extend the effective coverage area of small cell device 230 by relaying information between user device 210 and small cell device 230. As mentioned above, in some implementations, range extender device 240 may do so by operating as a repeater device (e.g., by using the cell ID of small cell device 230, the same channels as small cell device 230, etc.). In some implementations, range extender device 240 may relay information between user device 210 and small cell device 230, but may do so as a more independently operating device (e.g., by using its own cell ID, by independently selecting channels used by ranged extender device 240 to communicate with user device 210, etc.).

Process 300 may include collecting channel conditions information for an unlicensed spectrum (block 320). For instance, small cell device 230 and/or range extender device 240 may search for information about the channels of an unlicensed spectrum. In some implementations, small cell device 230 and/or range extender device 240 may collect channel condition information using a WiFi sniffer to detect Wi-Fi preambles.

In some implementations, small cell device 230 and/or range extender device 240 may identify channels that are empty (e.g., not being used within the coverage areas of small cell device 230 and/or range extender device 240), channels that are being affected by network activity (e.g., experiencing interference within the coverage areas of small cell device 230 and/or range extender device 240) at or below a pre-selected utilization threshold, and/or channels that are being utilized the least (e.g., open channels).

In some implementations, small cell device 230 and/or range extender device 240 may collect information corresponding to all of the channels within the unlicensed spectrum. In some implementations, small cell device 230 and/or range extender device 240 may only search amongst channels that correspond to a pre-selected portion of the unlicensed spectrum. For example, small cell device 230 and/or range extender device 240 may be restricted to using certain channels within the unlicensed spectrum (e.g., channels corresponding to a particular range of radio frequencies within the unlicensed spectrum).

In such implementations, small cell device 230 and/or range extender device 240 may collect channel conditions information corresponding to the channels to which small cell device 230 and/or range extender device 240 are restricted. In some implementations, small cell device 230 and/or range extender device 240 may be restricted to the same portion of the unlicensed spectrum. In some implementations, small cell device 230 and/or range extender device 240 may be restricted to the different portion of the unlicensed spectrum.

Figure 4:
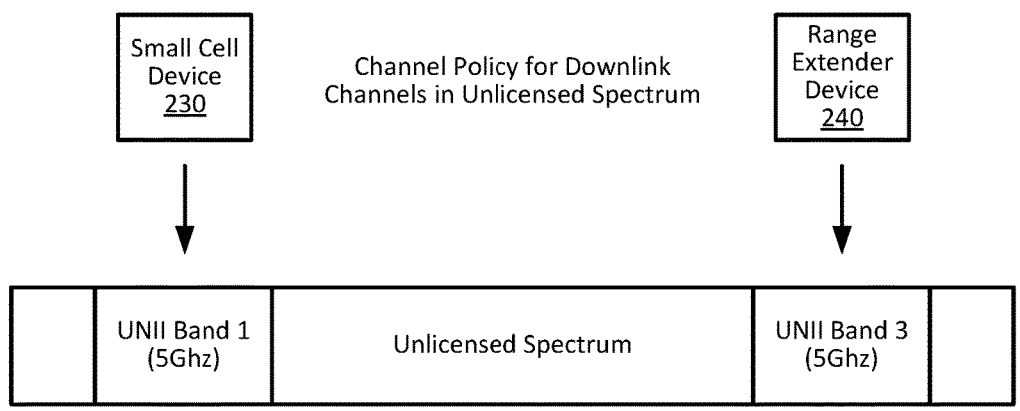
FIG. 4 is a block diagram of an example of channel restrictions that may be applied to a small cell device and/or a range extender device.

FIG. 4 is a block diagram of an example of channel restrictions that may be applied to small cell device 230 and range extender device 240. As shown, small cell device 230 and/or range extender device 240 may be restricted to downlink channels corresponding to particular portions of the unlicensed spectrum. For instance, small cell device 230 may be restricted to downlink channels within a range of frequencies of the unlicensed spectrum, such as the Unlicensed National Information Infrastructure (U-NII) Band 1 of the 5 GHz Unlicensed Spectrum. Similarly, range extender device 240 may be restricted to downlink channels within a different range of frequencies of the unlicensed spectrum, such as UNII Band 3 of the 5 GHz Unlicensed.

In some implementations, a different arrangement of restrictions may be applied to small cell device 230 and range extender device 240. For instance, in some implementations, only one of small cell device or range extender device 240 may be subject to a channel restriction. In other implementations, a downlink channel restriction applied to small cell device 230 may include a range of frequencies that overlaps with a downlink channel restriction applied to range extender device 240. Additionally, or alternatively, a downlink channel restriction applied to either of small cell device 230 or range extender device 240 may include two or more frequency ranges within the unlicensed spectrum. In some implementations, when PCS is being used with respect to the licensed spectrum channel, both small cell device 230 and range extender device 240 may dynamically select channels from a union of U-NII Band 1 and U-NII Band 3 (but different channels) and communicate the use of mutually exclusive channels over the licensed channel between them.

Figure 5:
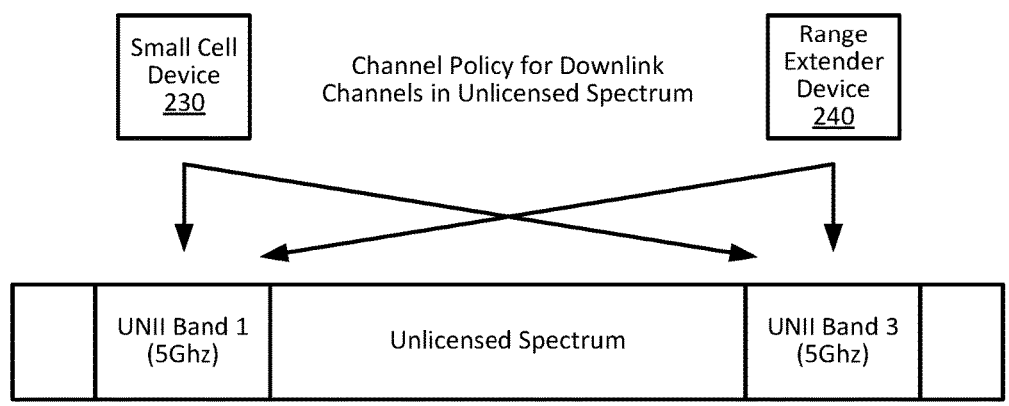
FIG. 5 is a block diagram of another example of channel restrictions that may be applied to a small cell device and/or a range extender device.

FIG. 5 is a block diagram of another example of channel restrictions that may be applied to small cell device 230 and range extender device 240. As shown, small cell device 230 and/or range extender device 240 may be restricted to downlink channels corresponding to the same portions of the unlicensed spectrum. For instance, small cell device 230 and range extender device 240 may each be permitted to use downlink channels of U-NII Band 1 and U-NII Band 3. However, other portions of the unlicensed spectrum may not be available to small cell device 230 and range extender device 240 for downlink channels. Similar to the examples provided above with reference to FIG. 4, a different arrangement of downlink channel restrictions may be applied to small cell device 230 and range extender device 240. For instance, small cell device 230 may be restricted to U-NII Band 1, whereas range extender device 240 may only be restricted to U-NII Band 1 and U-NII Band 3.

Referring now to FIG. 3, process 300 may further include providing channel conditions information to small cell device 230 (block 330). For example, range extender device 240 may provide channel condition information, collected by range extender device 240, to small cell device 230. In some implementations, doing so may better enable small cell device 230 to identify an appropriate channel within the unlicensed spectrum since there may be channel conditions within the coverage area of range extender device 240 that are not within the coverage area of small cell device 230. Additionally, since user device 210 may be in the coverage area of range extender device 240, but not within the coverage area of small cell device 230, channel conditions within the coverage area of range extender device 240 may be as important, or more important, to determining a reliable channel for sending information to user device 210. For instance, in implementations where range extender device 240 operates as a relatively simple relay or repeater device, channel conditions within the coverage area of range extender device 240 may be particularly important since range extender device 240 may use the same channel selected by small cell device 230.

Process 300 may include identifying an appropriate downlink channel for communicating information to user device 210 (block 340). For example, small cell device 230 and/or range extender device 240 may identify an appropriate channel, within the unlicensed spectrum, for reliably communicating information to user device 210. In some implementations, small cell device 230 and/or range extender device 240 may identify the appropriate downlink channel based on channel conditions information collected by small cell device 230 and/or range extender device 240.

For instance, in implementations where range extender device 240 includes a relatively simple relay or repeater device, small cell device 230 may identify an appropriate downlink channel based on a combination of channel conditions information collected by range extender device 240, and range extender device 240. In such implementations, range extender device 240 may not identify an appropriate downlink channel (independent from small cell device 230) since range extender device 240 may be designed to use whichever downlink channel is selected by small cell device 230.

By contrast, in implementations where range extender device 240 operates as a more independent device, small cell device 230 may identify a downlink channel that is appropriate for communicating information small cell device 230, and range extender device 240 may identify an appropriate downlink channel for communicating information from range extender device 240 to user device 210. In some implementations, the downlink channels identified by each of small cell device 230 and range extender device 240 may be the same downlink channel or different downlink channel.

Returning to FIG. 3, process 300 may also include using the identified downlink channel to send information to user device 210 (block 350). For example, small cell device 230 and/or range extender device 240 may use the downlink channels identified as appropriate for communicating information to user device 210. As described above, in some implementations, the downlink channel used by cell device 230 and range extender device 240 may be whichever downlink channel is identified as appropriate by small cell device 230. In other implementations, the downlink channel used by cell device 230 may be whichever is identified as appropriate by small cell device 230, while the downlink channel used by range extender device 240 may be whichever downlink channel is identified as appropriate by range extender device 240.

Figure 6:
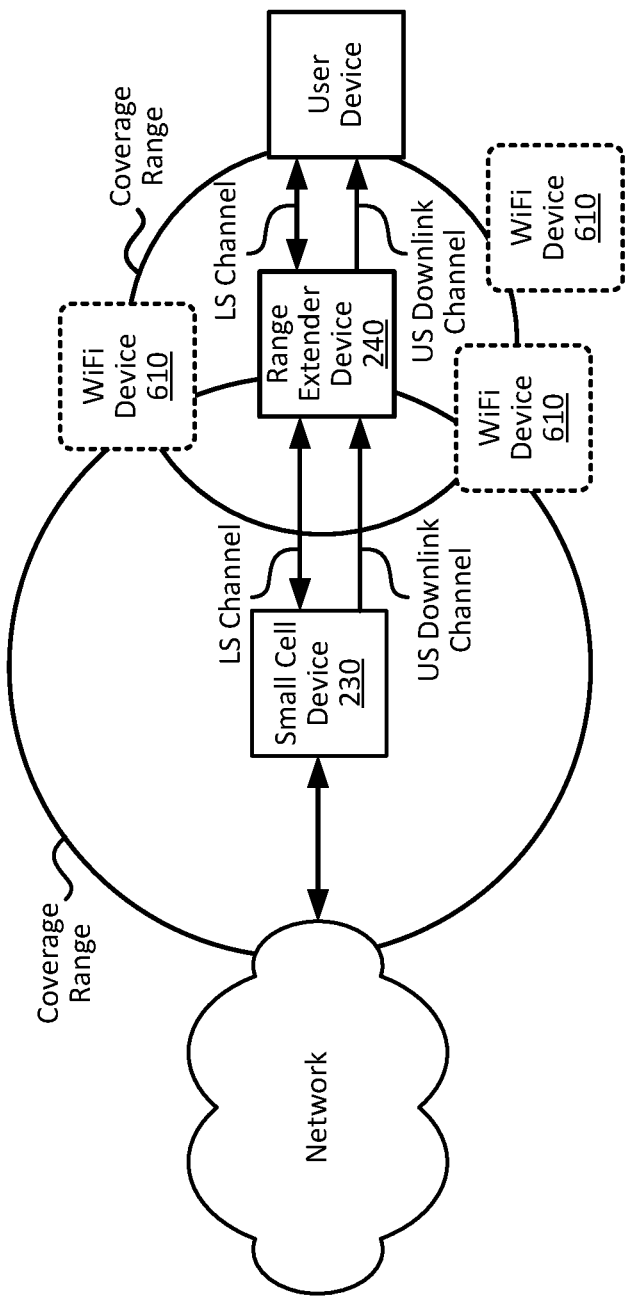
FIG. 6 is a diagram of an example for determining channel conditions that include wireless activity from one or more hidden nodes.

FIG. 6 is a diagram illustrating an example for determining channel conditions that include wireless activity from one or more hidden nodes. As shown, small cell device 230 and range extender device 240 may operate in an environment that includes hidden nodes, such as WiFi devices 610. As used herein, a WiFi device may include a user device, an access point, or another type of device that is capable of communicating in a WiFi network.

As described above, small cell device 230 and/or range extender device 240 may collect information corresponding to channel conditions within their respective coverage ranges. In some implementations, the channel conditions may include the activity of wireless devices that are operating in the vicinity of small cell device 230 and/or range extender device 240. For example, small cell device 230 and/or range extender device 240 may determine whether there are other LTE devices in the vicinity that are using one or more channels of the unlicensed spectrum, how much each channel is being used, how much each channel is being interfered with as a result of the activity, etc. In another example, small cell device 230 and/or range extender device 240 may also determine whether there are other types of devices (e.g., non-WiFi devices 6 in the vicinity that are also using the unlicensed spectrum.

Figure 7:
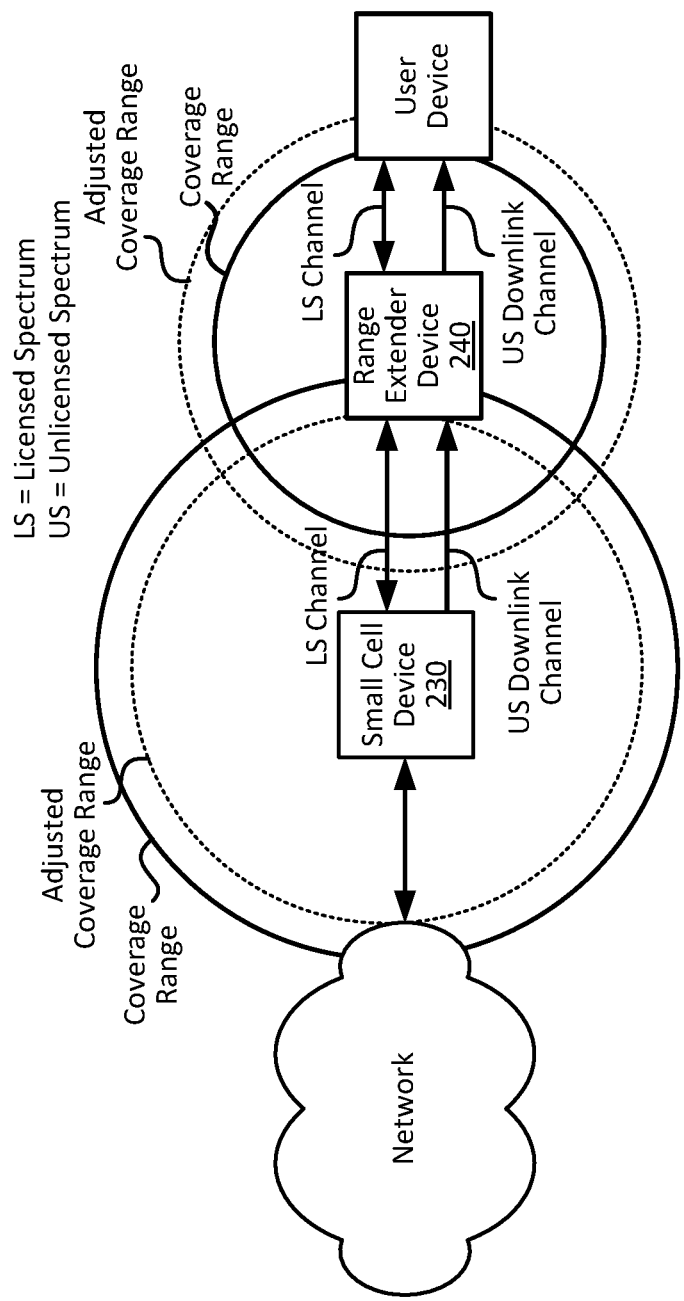
FIG. 7 is a diagram of an example of a small cell device and/or a range extender device determining channel conditions for different signal power output levels.

FIG. 7 is a diagram of an example of a small cell device 230 and/or a range extender device 240 determining channel conditions for different signal power output levels. As shown, small cell device 230 and range extender device 240 may include coverage ranges that are based on a power output by small cell device 230 and range extender device 240, respectively. Additionally, as described above, small cell device 230 and range extender device 240 may collect channel conditions information, which may include information about which channels (e.g., in a non-licensed spectrum) are being used and/or an amount of interference corresponding to each channel.

In some implementations, small cell device 230 and/or range extender device 240 may change the coverage range (e.g., by adjusting the output transmission power) corresponding to each device and collect the channel conditions information within the contexts of the different coverage areas. The different coverage areas may experience different levels of interference since, for example, smaller coverage areas may not include as many competing LTE devices and/or hidden nodes. As such, collecting channel conditions information within the contexts of the different coverage areas may, for example, enable small cell device 230 and/or range extender device 240 to determine whether a particular channel is viable in one coverage range even though the channel is not viable in another coverage range.

Figure 8:
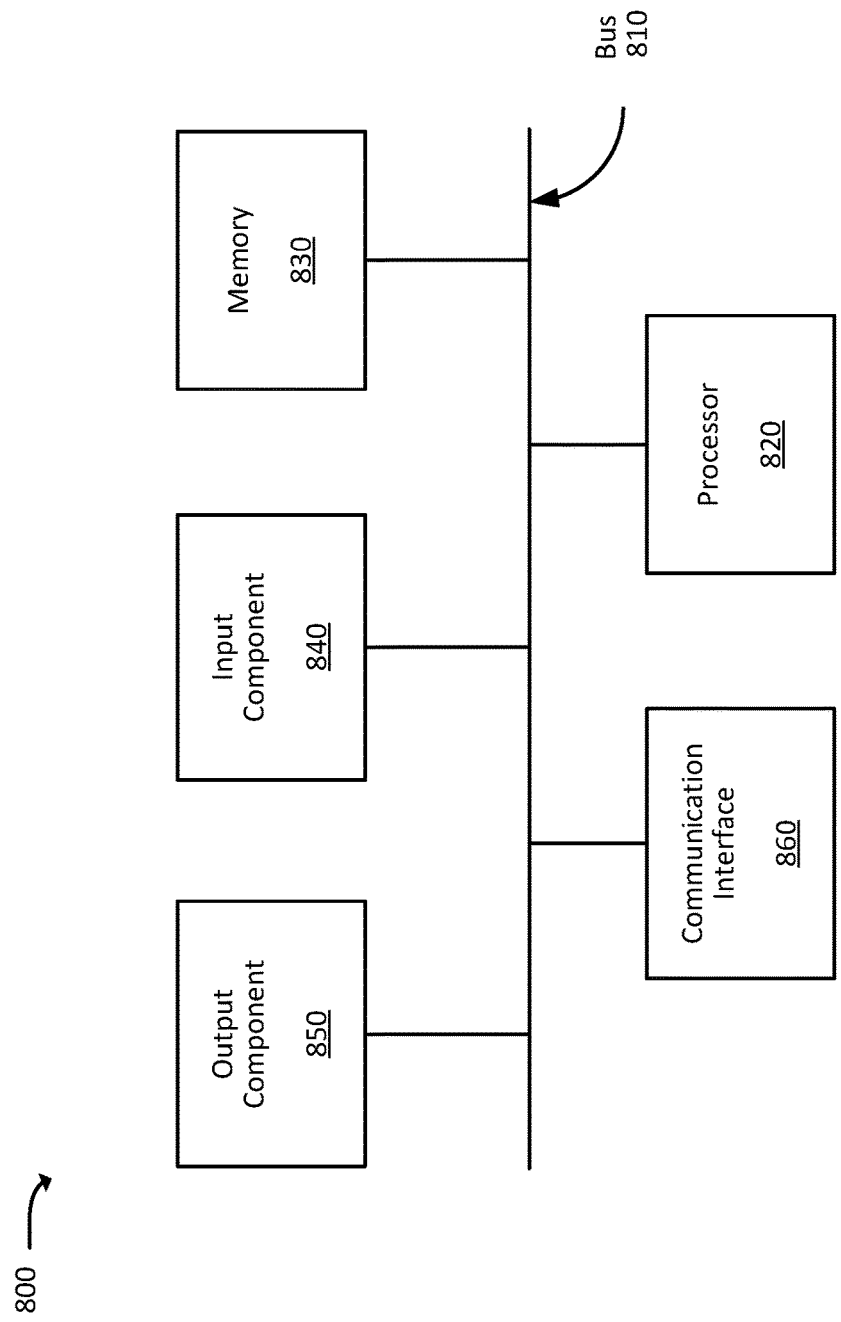
FIG. 8 is a diagram of example components of a device.

FIG. 8 is a diagram of example components of a device 800. Each of the devices illustrated in FIGS. 1A-2 and 4-8 may include one or more devices 800. Device 800 may include bus 810, processor 820, memory 830, input component 840, output component 850, and communication interface 860. In another implementation, device 800 may include additional, fewer, different, or differently arranged components. As described herein, a component may be implemented by hardware circuitry, software logic, and/or some combination thereof. The term "circuitry" may be broadly used herein to refer to a software implementation, software implementation, or combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1A-1B and 3 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A range extender device comprising:
   a non-transitory computer-readable medium storing a set of processor-executable instructions; and
   one or more processors configured to execute the set of processor-executable instructions, wherein executing the set of processor-executable instructions causes the one or more processors to:
      establish a first channel, corresponding to a licensed spectrum of radio frequencies, between the range extender device and a small cell device of a Long-Term Evolution (LTE) network, the first channel including first downlink capabilities and first uplink capabilities;
      establish a second channel, corresponding to the licensed spectrum of radio frequencies, between the range extender device and a user device located within a coverage area of the range extender device, the second channel including second downlink capabilities and second uplink capabilities;
      measure interference, corresponding to an unlicensed spectrum, experienced by the range extender device;
      provide information indicating the measured interference, experienced at the range extender device, to the small cell device,
         wherein the small cell device selects a first portion of the unlicensed spectrum and a second portion of the unlicensed spectrum based on the information indicating the measured interference experienced at the range extender device;
      establish a first downlink-only channel between the range extender device and the small cell device, the first downlink-only channel corresponding to the first portion of the unlicensed spectrum of radio frequencies, as selected by the small cell device;
      establish a second downlink-only channel between the range extender device and the user device, the second downlink-only channel corresponding to the second portion of the unlicensed spectrum, as selected by the small cell device, for augmenting the downlink capabilities of the second channel;
      receive communications, from the small cell device and intended for the user device, via a combination of the first channel and the first downlink-only channel; and
      send the communications to the user device, via a combination of the second channel and the second downlink-only channel.

2. The range extender device of claim 1, wherein the second channel is established based on the first channel such that the first channel and the second channel are the same channel.

3. The range extender device of claim 2, wherein the second downlink-only channel is established based on the first-downlink only channel such that the first downlink-only channel and the second downlink-only channel are the same downlink-only channel.

4. The range extender device of claim 1, wherein the small cell selects the second downlink-only channel from a plurality of downlink-only channels of the unlicensed.

5. The range extender device of claim 1, wherein executing the processor-executable instructions further causes the one or more processors to collect information regarding:
   an availability of a plurality of downlink-only channels of the unlicensed spectrum, and
   signal interference corresponding to each of the plurality of downlink-only channels.

6. The range extender device of claim 5, wherein the information includes signal interference measured at different levels of signal power.

7. The range extender device of claim 1, wherein:
   the licensed spectrum includes a spectrum of radio frequencies corresponding to Personal Communications Service (PWS) or Advanced Wireless Services (AWS) communications, and
   the unlicensed spectrum includes a spectrum of radio frequencies corresponding to 5 GigaHertz (GHz) spectrum corresponding to WiFi communications.

8. A method, comprising:
   establishing, by a range extender device in communication with a small cell device of a Long-Term Evolution (LTE) network, a first channel, corresponding to a licensed spectrum of radio frequencies, between the range extender device and the small cell device, the first channel including first downlink capabilities and first uplink capabilities;
   establishing, by the range extender device, a second channel, corresponding to the licensed spectrum of radio frequencies, between the range extender device and a user device located within a coverage area of the range extender device, the second channel including second downlink capabilities and second uplink capabilities;
   measuring, by the range extender device, interference, corresponding to an unlicensed spectrum, experienced by the range extender device;
   providing, by the range extender device, information indicating the measured interference, experienced at the range extender device, to the small cell device,
      wherein the small cell device selects a first portion of the unlicensed spectrum and a second portion of the unlicensed spectrum based on the information indicating the measured interference experienced at the range extender device;
   establishing, by the range extender device, a first downlink-only channel between the range extender device and the small cell device, the first downlink-only channel corresponding to the first portion of the unlicensed spectrum of radio frequencies, as selected by the small cell device;

establishing, by the range extender device, a second downlink-only channel between the range extender device and the user device, the second downlink-only channel corresponding to the unlicensed spectrum, as selected by the small cell device, for augmenting the downlink capabilities of the second channel;

receiving, by the range extender device, communications, from the small cell device and intended for the user device, via a combination of the first channel and the first downlink-only channel; and sending, by the range extender device, the communications to the user device, via a combination of the second channel and the second downlink-only channel.

9. The method of claim 8, wherein the second channel is established based on the first channel such that the first channel and the second channel are the same channel.

10. The method of claim 9, wherein the second downlink-only channel is established based on the first-downlink only channel such that the first downlink-only channel and the second downlink-only channel are the same downlink-only channel.

11. The method of claim 8, wherein the small cell selects the second downlink-only channel from a plurality of downlink-only channels of the unlicensed spectrum.

12. The method of claim 8, further comprising collecting information regarding:
an availability of a plurality of downlink-only channels of the unlicensed spectrum, and
signal interference corresponding to each of the plurality of downlink-only channels.

13. The method of claim 12, wherein the information includes signal interference measured at different levels of signal power.

14. The method of claim 8, wherein:
the licensed spectrum includes a spectrum of radio frequencies corresponding to Personal Communications Service (PWS) or Advanced Wireless Services (AWS) communications, and
the unlicensed spectrum includes a spectrum of radio frequencies corresponding to a 5 GigaHertz (GHz) spectrum, spanning Unlicensed National Information Infrastructure (U-NIT) Band 1 and U-NII Band 3.

15. A non-transitory computer-readable medium storing a set of processor-executable instructions, wherein execution of the set of processor-executable instructions by one or more processors causes the one or more processors to:
establish a first channel, corresponding to a licensed spectrum of radio frequencies, between the range extender device and a small cell device of a Long-Term Evolution (LTE) network, the first channel including first downlink capabilities and first uplink capabilities;
establish a second channel, corresponding to the licensed spectrum of radio frequencies, between the range extender device and a user device located within a coverage area of the range extender device, the second channel including second downlink capabilities and second uplink capabilities;
measure interference, corresponding to an unlicensed spectrum, experienced by the range extender device;
provide information indicating the measured interference, experienced at the range extender device, to the small cell device,
wherein the small cell device selects a first portion of the unlicensed spectrum and a second portion of the unlicensed spectrum based on the information indicating the measured interference experienced at the range extender device;
establish a first downlink-only channel between the range extender device and the small cell device, the first downlink-only channel corresponding to the first portion of the unlicensed spectrum of radio frequencies, as selected by the small cell device;
establish a second downlink-only channel between the range extender device and the user device, the second downlink-only channel corresponding to the second portion of the unlicensed spectrum, as selected by the small cell device, for augmenting the downlink capabilities of the second channel;
receive communications, from the small cell device and intended for the user device, via a combination of the first channel and the first downlink-only channel; and
send the communications to the user device, via a combination of the second channel and the second downlink-only channel.

16. The non-transitory computer-readable medium of claim 15, wherein the second channel is established based on the first channel such that the first channel and the second channel are the same channel.

17. The non-transitory computer-readable medium of claim 16, wherein the second downlink-only channel is established based on the first-downlink only channel such that the first downlink-only channel and the second downlink-only channel are the same downlink-only channel.

18. The non-transitory computer-readable medium of claim 15, wherein the small cell selects the second downlink-only channel from a plurality of downlink-only channels of the unlicensed spectrum.

19. The non-transitory computer-readable medium of claim 15, wherein the set of processor-executable instructions further includes processor-executable instructions to collect information regarding:
an availability of a plurality of downlink-only channels of the unlicensed spectrum, and
signal interference corresponding to each of the plurality of downlink-only channels.

20. The non-transitory computer-readable medium of claim 19, wherein the information includes signal interference measured at different levels of signal power.

* * * * *